(12) United States Patent
Daido et al.

(10) Patent No.: US 6,881,438 B2
(45) Date of Patent: Apr. 19, 2005

(54) PROCESS FOR PRODUCTION OF COMPOSITE POROUS FILM

(75) Inventors: Takahiro Daido, Iwakuni (JP); Satoshi Igarashi, Iwakuni (JP); Satoshi Nishikawa, Iwakuni (JP); Hiroyuki Honmoto, Iwakuni (JP); Hiroyoshi Minematsu, Iwakuni (JP); Youji Yanagi, Iwakuni (JP); Yasushi Kitagishi, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/180,969

(22) Filed: Jun. 27, 2002

(65) Prior Publication Data

US 2002/0197413 A1 Dec. 26, 2002

Related U.S. Application Data

(63) Continuation-in-part of application No. 09/959,538, filed as application No. PCT/JP01/01785 on Mar. 7, 2001, now Pat. No. 6,818,352.

(30) Foreign Application Priority Data

| Mar. 7, 2000 | (JP) | ................................. 2000-61674 |
| Apr. 27, 2000 | (JP) | ................................. 2000-127309 |
| Oct. 24, 2000 | (JP) | ................................. 2000-323795 |
| Sep. 28, 2001 | (JP) | ................................. 2001-301302 |

(51) Int. Cl.[7] .............................. B05D 1/18; B05D 1/26; B05D 1/40
(52) U.S. Cl. .................... 427/115; 427/58; 427/209; 427/354; 427/358; 427/365; 427/430.1; 427/434.2; 427/434.4
(58) Field of Search .................... 427/58, 115, 209, 427/358, 354, 430.1, 434.2, 434.4, 365; 118/117, 405, 414; 429/144, 231.95

(56) References Cited

U.S. PATENT DOCUMENTS

| 3,174,879 A | | 3/1965 | Stanimirovitch |
| 3,953,241 A | * | 4/1976 | Langer et al. ............... 429/142 |

(Continued)

FOREIGN PATENT DOCUMENTS

| EP | 0 959 510 A2 | 11/1999 |
| EP | 1 191 622 A1 | 3/2002 |

(Continued)

OTHER PUBLICATIONS

European Search Report Issued Dec. 16, 2003.
Linden, "Handbook of Batteries, 3rd Editiion," pp. 35–4 to 35–5 (2002).

*Primary Examiner*—Katherine Bareford
(74) *Attorney, Agent, or Firm*—Rader, Fishman Grauer PLLC (57) ABSTRACT

A process for production of a composite porous film wherein a porous support, of which both sides have been coated with a solution (dope) of an organic polymer compound in a water-soluble organic solvent to form a coated film, is passed through an air gap step and conveyed into a coagulating bath comprising water or a mixture of water with the same solvent as the organic solvent, and is then immersed in the coagulating bath so that the coated film on both surfaces of the porous support directly contact the coagulating bath for coagulation, and is then washed and dried. This production process is suitable for production of non-aqueous secondary battery separators, and yields non-aqueous secondary battery separators with good handling properties and at low cost, whereby the ion permeability, adhesion with electrodes and electrolyte solution retention can be strictly controlled.

18 Claims, 6 Drawing Sheets

U.S. PATENT DOCUMENTS

| | | | |
|---|---|---|---|
| 5,362,582 A | * 11/1994 | Chang et al. ............... 429/249 |
| 5,665,265 A | 9/1997 | Gies et al. |
| 5,708,351 A | 1/1998 | Takamoro |
| 5,721,067 A | 2/1998 | Jacobs et al. |
| 5,834,135 A | 11/1998 | Pendalwar et al. |
| 6,194,874 B1 | 2/2001 | Kalegeropolous |
| 6,514,638 B1 | 2/2003 | Kurose et al. |
| 2001/0004502 A1 | 6/2001 | Nakamizo et al. |
| 2001/0004504 A1 | 6/2001 | Nakamizo et al. |

FOREIGN PATENT DOCUMENTS

| | | | |
|---|---|---|---|
| EP | 1 233 036 | * | 8/2002 |
| GB | 2 357 896 | | 7/2001 |
| JP | 51-137760 | * | 11/1976 |
| JP | 05-62712 | | 3/1993 |
| JP | 6-338347 | | 6/1994 |
| JP | 07-153494 | | 6/1995 |
| JP | 11-3731 | | 1/1999 |
| JP | 11-45742 | | 2/1999 |
| JP | 11-045740 | | 2/1999 |
| JP | 2928779 | | 5/1999 |
| JP | 2000-57847 | | 2/2000 |
| JP | 2000-067917 | | 3/2000 |
| JP | 3061756 | | 4/2000 |
| JP | 3061759 | | 4/2000 |
| JP | 2000-228215 | | 8/2000 |
| JP | 3113652 | | 9/2000 |
| JP | 2000-251932 | | 9/2000 |
| JP | 2000-277147 | | 10/2000 |
| JP | 2000-306610 | | 11/2000 |
| JP | 2002-042867 | | 2/2002 |
| JP | 2002-166218 | * | 6/2002 |
| WO | WO-98/54778 A1 | | 12/1998 |
| WO | 01/19906 | * | 3/2001 |

* cited by examiner

PROCESS FOR PRODUCTION OF COMPOSITE POROUS FILM

CROSS-REFERENCE TO RELATED APPLICATION

This application is a continuation-in-part of application Ser. No. 09/959,538, filed Oct. 29, 2001 now U.S. Pat. No. 6,818,352, which is a 371 of PCT/JP01/01785 Mar. 07, 2001.

BACKGROUND OF THE INVENTION

1. Field of the Invention

The present invention relates to a process for production of a composite porous film. In particular, the invention relates to a process for production of a composite porous film which is suitable as a filter or battery separator and, particularly, as a separator for a non-aqueous secondary battery.

2. Description of the Related Art

Non-aqueous secondary batteries that employ a lithium-containing transition metal oxide as the positive electrode, a lithium dopable/dedopable carbon-based material as the negative electrode and a non-aqueous electrolyte solution as the electrolyte solution (lithium ion secondary batteries) are characterized by having high energy density compared to other types of secondary batteries. Lithium ion secondary batteries so characterized meet demands for lighter and thinner portable electronic devices, and are used as power sources for portable electronic devices such as cellular phones and laptop computers. However, demands are increasing for even lighter and thinner portable electronic devices. In light of these circumstances, efforts are currently underway toward active technological development to achieve greater energy density with lithium ion secondary batteries to be used for such devices.

With increasing demand for thinner and lighter flat lithium ion secondary batteries for use primarily in cellular phones, a technological revolution has occurred due to a shift from the conventional metal cans to aluminum laminate films for outer casings. Aluminum-plastic laminated film casings (film casings) differ from metal can casings in that they are flexible casings and therefore susceptible to external pressure, while achieving contact between the electrodes and the separator interface is also difficult. Fluid leakage is another concern which constitutes a problem in terms of safety. For this reason, conventional positive electrode/separator/negative electrode battery structures have not been realized for film-cased batteries.

A technological revolution was achieved, under these circumstances, by the technique of using a separator with excellent adhesion to electrodes and electrolyte solution retention. Using such a separator has permitted satisfactory interface contact between the electrodes and separator, and has been able to prevent fluid leakage. Such separators are made of organic polymer compounds which swell in the electrolyte solution and retain it. It has been considered to use such organic polymer compounds alone as separators, but they have not been suitable for continuous production due to problems with their mechanical properties, and their practical use has been mainly in a form reinforced by supports.

That is, there have been proposed separators wherein both sides of a porous support are coated with an adhesive layer comprising an organic polymer compound which swells in the electrolyte solution and retains it. As porous supports there have been proposed nonwoven fabrics, or polyolefin fine porous films such as those used as separators in conventional lithium ion secondary batteries, but at the current time, polyolefin porous films have been employed for the most part from the standpoint of safety based on the shut-down characteristics. As adhesive layers there have been primarily used organic polymer compounds composed mainly of polyvinylidene fluoride (PVdF) from the standpoint of durability.

Battery structures wherein an adhesive layer is situated between the electrode and the separator have been noted not only from the standpoint of allowing film casings but also from the standpoint of allowing higher energy density in batteries even with conventional metal casings. Higher energy density entails a greater degree of packing more battery elements into a can of the prescribed size. The cycle properties have become a problem since it is difficult to form a satisfactory electrode separator interface under such circumstances, but this problem can conceivably be solved by providing a flexible adhesive layer as mentioned above.

When the adhesive layer is a dense layer, it becomes exceedingly difficult to achieve both adhesion with the electrodes and ion permeability, and a partial coating has therefore been proposed as in Japanese Unexamined Patent Publication No. 2001-118558. However, with partial coating, it is not a simple task to obtain a satisfactory interface junction due to the lack of uniformity of the electrode/separator interface. Providing pores in the adhesive layer has been considered a suitable strategy for achieving both ion permeability and adhesion with the electrodes, and wet film-forming methods are believed to be suitable pore-forming methods from the standpoint of easy control of morphology. In light of this, PVdF (polyvinylidene fluoride) porous films surrounding porous supports have been proposed as non-aqueous secondary battery separators in Japanese Unexamined Patent Publication No. 11-026025, etc.

A substantial production process for such a separator has been proposed in Japanese Unexamined Patent Publication No. 10-64503.

Japanese Unexamined Patent Publication No. 10-64503 proposes a separator which is an integrated composite of a nonwoven fabric and an adhesive layer, and a process for its production. The publication describes production of a non-woven fabric-composited PVdF-based porous film by casting a solution (dope) of PVdF onto a carrier film and then pressing a nonwoven fabric thereover to impregnate the carrier film with the coagulating bath.

A major drawback of this production process is that a difference occurs in the coagulating speed of the front and back sides when the carrier film is immersed in the coagulating bath, such that the resulting separator is asymmetrical from the viewpoint of the sides, i.e. the front and back, of the nonwoven fabric. A non-aqueous secondary battery separator of this type requires properties such as ion permeability, adhesion with electrodes and electrolyte solution retention, which are related to the surface morphology of the separator, and therefore equivalent properties are preferred at the positive electrode interface and the negative electrode interface. Thus, from the standpoint of strictly controlling these properties, a front/back symmetrical structure is believed to be preferred, and therefore a production process which results in front/back asymmetry is not desirable.

Another aspect that is considered a drawback is that the impregnation is accomplished by a system in which the nonwoven fabric is pressed from the top of the dope cast onto the carrier film. In this system, the rate is determined by compatibility between the dope and the nonwoven fabric, and combinations with poor compatibility are believed to create impregnation irregularities, resulting in voids and often impairing the quality of the separator. Moreover, it is very difficult to position the nonwoven fabric at the center, and the small thickness can result in curling, which creates problems in terms of handling. Furthermore, this system can only be applied to porous supports such as nonwoven fabrics wherein the dope substantially impregnates through to the interior, and cannot be applied to porous supports such as polyolefin fine porous films, wherein the dope fails to completely impregnate through to the interior.

In addition, although this production process employs a carrier film, the use of a carrier film is not preferred from the standpoint of production cost.

SUMMARY OF THE INVENTION

In light of these circumstances, it is an object of the present invention to provide a process for production of a composite porous film comprising an organic polymer compound surrounding a porous support with a front/back symmetrical structure, which may be applied essentially to any type of porous support and which is particularly suitable as a non-aqueous secondary battery separator. It is another object of the invention to provide a process for production of a non-aqueous secondary battery separator with good handling properties and low cost, whereby the ion permeability, adhesion to electrodes and electrolyte solution retention can be strictly controlled.

In the course of attempting to solve the problems described above, the present inventors have discovered that, by using a process for production of a composite porous film wherein a porous support, which is coated with a dope (solution) of an organic polymer compound dissolved in a water-soluble organic solvent and coated so as to form a coated film on both sides thereof, is subjected to an air gap step and conveyed into a coagulating bath containing a coagulating solution consisting of water or a mixture of water with the same solvent as the organic solvent and is immersed in the coagulating bath so that the coated film on both surfaces of the porous support contact directly with the coagulating bath, and is then washed and dried, it is possible to achieve excellent structural properties, dope impregnating properties and industrial productivity and, especially, to strictly control the ion permeability, adhesion to electrodes and electrolyte solution retention, thereby providing a composite porous film and, especially, a non-aqueous secondary battery separator, with good handling properties and at low cost. The present invention has been completed on the basis of this discovery.

In other words, the first invention is a process for production of a composite porous film composed of an organic polymer compound surrounding a porous support, which process comprises coating both sides of a porous support with a solution (dope) of an organic polymer compound and a water-soluble organic solvent using a coating apparatus, subsequently subjecting it to an air gap step and conveying the coated porous support into a coagulating bath containing a coagulating solution consisting of water or a mixture of water with the same solvent as the organic solvent, immersing the porous support in the coagulating bath so that the coated film on both surfaces of the coated porous support contacts directly with the coagulating bath for coagulation, and then washing and drying it.

The following inventions are also encompassed by the first invention.

1. A process according to the first invention, wherein the air gap step is 1–100 cm.
2. A process according to 1. above, wherein the coagulating bath is situated under the coating apparatus.
3. A process according to the first invention, wherein the coating step comprises retaining the dope in the porous support and then passing the dope-retaining porous support between two opposing Meyer bars having a prescribed clearance along the conveyance path of the porous support, to form a coated film of uniform thickness on both sides of the porous support.
4. A process according to 3. above, wherein the two Meyer bars are positioned parallel, and the porous support is passed perpendicularly between the Meyer bars to retain the dope in the porous support.
5. A process according to the first invention, wherein the coating step comprises passing the porous support between two opposing dies, which supply the dope at a constant quantity along the conveyance path of the porous support, to form a coated film of uniform thickness on both sides of the porous support.
6. A process according to 5. above, wherein the dope is supplied in an equivalent amount from the two dies.

The second invention is a process for production of a non-aqueous secondary battery separator capable of producing electromotive force by lithium doping/dedoping, which process comprises coating both sides of a porous support for a non-aqueous secondary battery separator with a solution (dope) comprising an organic polymer compound and a water-soluble organic solvent using a coating apparatus, subsequently subjecting it to an air gap step and conveying the coated porous support into a coagulating bath containing a coagulating solution consisting of water or a mixture of water with the same solvent as the organic solvent, immersing the porous support in the coagulating bath so that the coated film on both surfaces of the coated porous support contacts directly with the coagulating bath for coagulation, and then washing and drying it.

The following inventions are also encompassed by the second invention.

7. A process according to the second invention, wherein the air gap step is 1–100 cm.
8. A process according to 7. above, wherein the coagulating bath is situated under the coating apparatus.
9. A process according to the second invention, wherein the organic polymer compound is polyvinylidene fluoride (PVdF), a PVdF copolymer or an organic polymer compound composed mainly of PVdF.
10. A process according to the second invention, wherein the porous support has a thickness of 5–45 $\mu$m and a MacMullin number of 2–20.
11. A process according to 10. above, wherein the porous support is a nonwoven fabric.
12. A process according to the second invention, wherein the coating step comprises retaining the dope in the porous support and then passing the dope-retaining porous support between two opposing Meyer bars having a prescribed clearance along the conveyance path of the porous support, to form a coated film of uniform thickness on both sides of the porous support.
13. A process according to 12. above, wherein the two Meyer bars are positioned parallel, and the porous support is passed perpendicularly between the Meyer bars to retain the dope in the porous support.
14. A process according to the second invention, wherein the coating step comprises passing the porous support between two opposing dies, which supply the dope at a constant quantity along the conveyance path of the porous support, to form a coated film of uniform thickness on both sides of the porous support.

15. A process according to 14. above, wherein the dope is supplied in an equivalent amount from the two dies.

16. A process according to the second invention, wherein the dope contains a phase-separating agent at a concentration of 5–50 wt %, or the proportion of water in the coagulating bath is 30–70 wt %.

BRIEF DESCRIPTION OF THE DRAWINGS

FIG. 3a and FIG. 3b show the results of SEM observation of the non-aqueous secondary battery separator fabricated in Example 1.

FIG. 4a and FIG. 4b show the results of SEM observation of the non-aqueous secondary battery separator fabricated in Example 2.

FIG. 5a and FIG. 5b show the results of SEM observation of the non-aqueous secondary battery separator fabricated in Example 5.

FIG. 6a and FIG. 6b show the results of SEM observation of the non-aqueous secondary battery separator fabricated in Example 6.

FIG. 7a and FIG. 7b show the results of SEM observation of the non-aqueous secondary battery separator fabricated in Example 7.

DETAILED DESCRIPTION OF THE INVENTION

[Process for Production of Composite Porous Film]

The process for production of a composite porous film according to the invention is characterized by coating both sides of a porous support with a dope (solution) of an organic polymer compound and a water-soluble organic solvent using a coating apparatus, subsequently subjecting it to an air gap step and conveying the coated porous support into a coagulating bath containing a coagulating solution consisting of water or a mixture of water with the same solvent as the organic solvent, immersing the porous support in the coagulating bath so that the coated film on both surfaces of the coated porous support contacts directly with the coagulating bath for coagulation, and then washing and drying it, to obtain a composite porous film.

The major feature of the process for production of a composite porous film according to the invention is the aspect that the dope-coated porous support is immersed in the coagulating bath so that both surfaces thereof contact directly with the coagulating bath to form a coated film, coagulating the dope impregnated in the support. Thus, the composite porous film obtained according to the production process of the invention has a back/front symmetrical morphology with the support as the axis of symmetry, while the surface morphology is also equivalent on the front and the back. The morphology can be controlled by the dope composition and the coagulating bath composition. It is therefore possible to achieve the same properties such as adhesion, permeability and solution retention on the front and back, as properties that are important for the surface morphology, while also controlling the properties to a high degree. The composite porous film production process of the invention is extremely effective when producing a composite porous film requiring the same properties on the front and back for the purposes of its use.

The composite porous film production process of the invention is characterized in that the porous support coated on both sides with the dope using a coating apparatus is subjected to an air gap step and is conveyed into a coagulating bath. As will be explained concretely in the examples which follow, an "air gap step" is step in which the coating apparatus, for example the dispensing/smoothing jig or the die lip, and the coagulating bath are not directly in contact but rather, the step is carried out across a constant distance.

The first advantage of providing an air gap step is an advantage from the standpoint of temperature adjustment control. For example, without an air gap step, it is very difficult to control the temperature when carrying out the process if the dope temperature and coagulating bath temperature differ. The second advantage is from the standpoint of controlling the morphology of the composite porous film. A leveling effect occurs in the air gap step, and therefore providing such a step can stabilize production for uniform coating of the dope on both sides of the porous support. Furthermore, distancing the coating apparatus and the coagulating bath from each other by providing an air gap step has the additional advantage of stabilizing the step by an effect of preventing gelling of the dope during coating by infiltration of the coagulating bath or its vapor. The air gap step is preferably 1–100 cm, and more preferably 5–50 cm. If the air gap step is too short it may not be possible to achieve the aforementioned effect. If it is too long, pinholes may be created, or control of conveyance hampered, depending on the compatibility between the porous support and the dope, thus making stabilization difficult to achieve and undesirably increasing the apparatus size.

The positioning of the apparatus or the direction of conveyance of the porous support can be important factors for the composite porous film production process of the invention. In terms of process flow it is preferred not to alter the direction of conveyance by clamping the bars in the air gap step. If the bars are clamped, the dope will be scraped off by the bars, thus making it difficult to dispense the dope coated on the porous support by the coating apparatus, and thereby hampering production of a uniform composite porous film. This creates a particular hindrance against precise control of the thickness or basis weight, or production of thin films. In order to avoid clamping the bars so that the direction of conveyance is not altered, the coagulating bath must be positioned below the coating apparatus through the air gap step, with the conveyance from top to bottom. That is, it is also preferred in the composite porous film production process of the invention for the coagulating bath to be positioned below the coating apparatus, so that conveyance of the porous support from top to bottom will allow the dope to be coated more uniformly on both sides, entering directly into the coagulating bath without changing the direction of conveyance after coating. In this case, positioning the coagulating bath below the coating apparatus means simply that the porous support is positioned roughly at the center to retain the impregnated dope on both sides of the porous support with uniform front/back symmetry, but they do not necessarily need to be in a vertical relationship. After coagulation, the coagulated porous support may be raised by a bar situated in the coagulating bath and washed and dried to complete production of the composite porous film.

The method of coating the dope onto both sides of the porous support (hereinafter also referred to as a "support") may be a known coating method, such as a dip coating method wherein the support is immersed in the dope and then drawn out and dispensed using a bar, blade or the like (for example, Japanese Unexamined Patent Publication No. 7-289964) or a transfer coating method wherein the dope dispensed with a die or coating roll is transferred to the support (for example, Japanese Unexamined Patent Publication No. 62-42764).

Among these methods, it is preferred for the support retaining an excess of the dope to be passed between two opposing Meyer bars with a prescribed clearance across the path of conveyance of the support. This method allows control of the coated film thickness by changing the diameter and/or clearance of the two Meyer bars and/or the Meyer bar winding diameter. The dope-retaining method is not particularly restricted and may be an impregnation method, spray method or the like, but methods in which the support is immersed or passed through the dope bath are particularly preferred. The amount of solution retained may be appropriately adjusted according to the amount of dope to be impregnated in the support, the thickness of the film containing the organic polymer compound to be formed uniformly on both sides of the support, the dope properties and the retention of the dope in the support. The dope is preferably retained on both the front and back sides of the support from the standpoint of simultaneously forming a uniform coated film.

Figure 1:
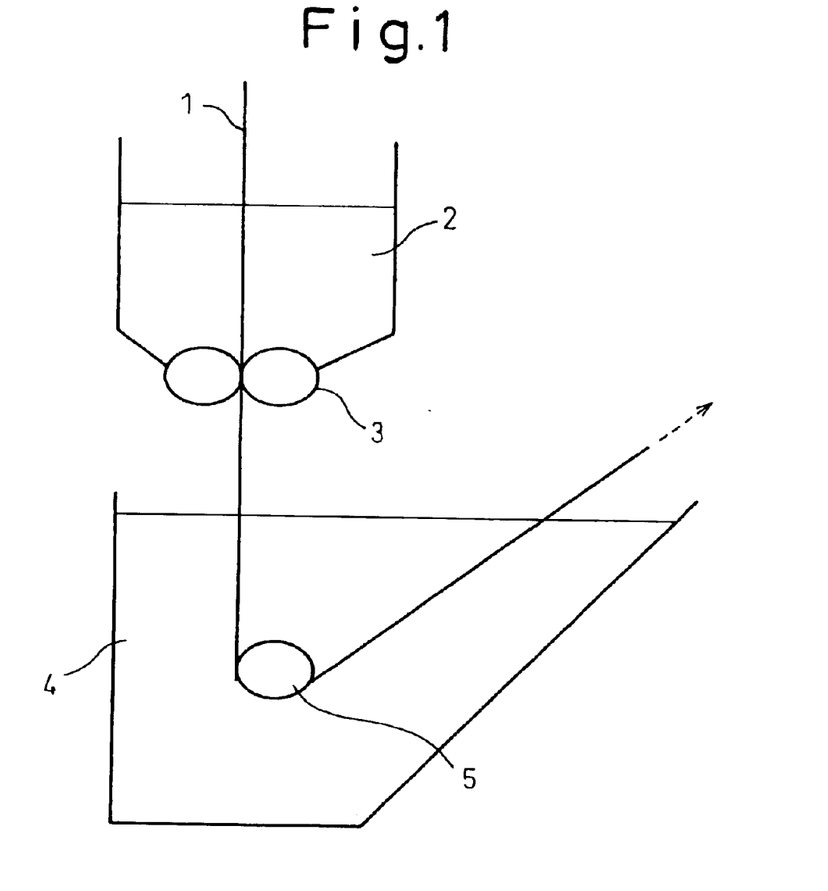
FIG. 1 shows an embodiment of an apparatus for carrying out the non-aqueous secondary battery separator production process of the invention.

The film-forming apparatus shown in FIG. 1 may be employed when using a dope bath, wherein 1 is a porous support, 2 is a doping bath, 3 is a dispensing/smoothing jig, 4 is a coagulating bath and 5 is a bar. In this production process, there is a preferred direction for conveyance from the coating apparatus (dope bath and dispensing/smoothing jig) to the coagulating bath, the preferred direction being downward, in which case the positional relationship between the dope bath and the dispensing/smoothing jig is important. When the direction of conveyance from the coating apparatus to the coagulating bath is from the top downward, it is preferred for the porous support to enter from the top of the dope bath and exit downward, and then pass through the dispensing/smoothing jig. That is, the dispensing/smoothing jig is preferably situated below the dope bath. From the standpoint of facilitating dispensing of the dope, it is particularly preferred that two dispensing/smoothing jigs are situated parallelly, with the support passing through them either vertically or approximately vertically. By employing such a method it is possible to easily produce a composite porous film having porous layers with equal thicknesses on the front and back sides of the porous support, and composed of equal weights of the organic polymer. Preferably the dope bath and two dispensing/smoothing jigs are integrated and the bottom of the dope bath is sealed at the top of the two dispensing/smoothing jigs, because this allows the support to be immersed in the coagulating bath immediately after dispensing and makes it possible to eliminate the need for recovering excess dope scraped off by the dispensing/smoothing jig.

Figure 2:
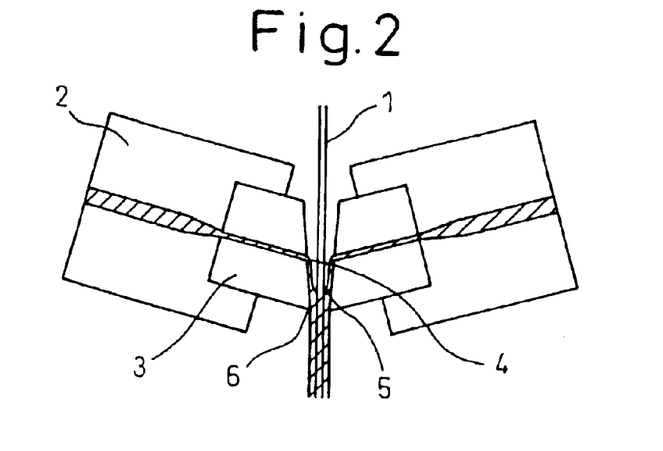
FIG. 2 shows an embodiment of an apparatus used for die coating according to the invention.

A different method involves passing the dope through two opposing dies with a prescribed clearance across the path of conveyance of the support. As shown in FIG. 2, 1 is a porous support, 2 is a die body, 3 is a conveying exit lip, 4 is a die discharge section, 5 is a liquid pool space and 6 is the conveying exit end of a die lip. Such a system, as shown in FIG. 2, has a narrow clearance between the support and the die lip conveying exit ends of the support conveying exit lips from the die discharge section, and the dope supplied in a quantitative manner in the widthwise direction accumulates in a liquid pool space formed by positioning opposite the support, allowing continuous impregnation and dispensing of the dope into the support. In this system, the thickness of the coated film can be controlled by changing the clearance between the support and the die lip conveying exit ends at the tips of the lips at the support exit end. The coating width can be controlled by changing the discharge width and supply amount for discharge of the dope from the die, and this is preferred since no excess dope is generated if coating is accomplished to the same width or just less than the width of the support. In order to produce a composite porous film with a porous layer comprising the organic polymer to the same thickness and weight on both sides of the support by this process, it is sufficient to use an equal dope discharge amount on both sides of the support.

Since the dope is coated on both sides according to the production process of the invention, voids due to impregnation defects are not produced even when the combination is such that the compatibility of the support and dope is somewhat poor to the point of hampering impregnation. Positioning the support roughly at the center also facilitates coating of an equal amount of dope on both sides, such that handling problems such as curls do not occur even when a thin film is formed.

[Uses]

A composite porous film obtained by the composite porous film production process of the invention may be used as a filter, a battery separator, or the like. Considering the features of a composite porous film obtained by the production process of the invention, the production process is particularly suited for production of non-aqueous secondary battery separators. That is, a non-aqueous secondary battery separator requires properties such as ion permeability, adhesion to electrodes and solution retention, which are related to the surface morphology of the separator and, therefore, a basically equivalent surface morphology is preferred on the front and back sides for strict control of these properties.

[Non-aqueous Secondary Battery Separator Production Process]

When the intended use is a non-aqueous secondary battery separator, the organic polymer compound is suitably an organic polymer compound which can swell in and retain the electrolyte solution, such as polyvinylidene fluoride (PVdF), polyacrylonitrile (PAN), polyethylene oxide (PEO) or polymethyl methacrylate (PMMA), or a copolymer thereof, or an organic polymer compound composed mainly thereof. Such organic polymer compounds may also be used in admixture.

PVdF, PVdF copolymer and organic polymer compounds composed mainly of PVdF are especially preferred from the standpoint of oxidation/reduction-resistance and film-forming properties. Among these, terpolymers of vinylidene fluoride (VdF), hexafluoropropylene (HFP) and chlorotrifluoroethylene (CTFE) are preferred for their excellent swelling property, heat resistance and adhesion to electrodes, and a preferred composition for such terpolymers is:

VdF/HFP (a)/CTFE (b)

(a)=2–8 wt %

(b)=1–6 wt %.

The molecular weight of the organic polymer compound is preferably 100,000–800,000, and especially 200,000–600, 000, in terms of weight-average molecular weight (Mw). Such PVdF-based polymers may be synthesized by publicly known methods. In most cases they may be produced by radical polymerization and, specifically, by solution polymerization, suspension polymerization, emulsifying polymerization, bulk polymerization or the like.

According to the production process of the invention it is possible to control the morphology of the obtained porous film by the composition of the dope and the composition of the coagulating solution. A non-aqueous secondary battery separator requires properties such as ion permeability, electrolyte solution retention and adhesion to electrodes. The dope and coagulating solution are preferably adjusted so as to obtain a morphology that adequately provides these properties. The dope is preferably obtained by dissolving the organic polymer compound in a water-soluble organic solvent, and if necessary adding an appropriate amount of a phase separating agent which is a poor solvent for the organic polymer compound. When a phase separating agent is added, the water-soluble organic solvent will also contain a phase separating agent. The coagulating solution used may be water or a mixture of water with the water-soluble organic solvent used for the dope (with the optional addition of a phase separating agent).

The water-soluble organic solvent used in the dope is suitable so long as it can dissolve the organic polymer compound. When the organic polymer compound is a PVdF-based polymer it is preferably a highly polar one, and there may be suitably selected N-methylpyrrolidone (NMP), N,N-dimethylacetamide (DMAc), N,N-dimethylformamide (DMF), dimethylsulfoxide (DMSO), acetonitrile and the like, as well as mixtures thereof. The preferred organic polymer compound concentration in the dope will differ depending on the film-forming conditions, but it will usually be appropriately selected within 5–18 wt %.

The phase separating agent used may be any one which is a poor solvent for the organic polymer compound. When the organic polymer compound is a PVdF-based polymer, there may be appropriately selected, for example, water or an alcohol, and especially polypropylene glycol (PPG), ethylene glycol, tripropylene glycol (TPG), 1,3-butanediol, 1,4-butanediol, polyethylene glycol monoethyl ether, methanol, ethanol, polyhydric alcohols such as glycerin, and the like, including polymers. The preferred phase separating agent concentration in the dope will differ depending on the film-forming conditions, but in most cases it will be appropriately selected in the range of 0–60 wt %, and especially 5–50 wt %, in the mixed solvent of the water-soluble organic solvent and the phase separating agent. In order to obtain adequate ion permeability for a non-aqueous secondary battery separator, not only the support but also the layer composed of the organic polymer is preferably rendered porous so that sufficient pores are also present in the surface. If the phase separating agent concentration is low, it tends to be difficult to achieve such morphology. If the phase agent concentration is too high, the dope tends to gel, making it difficult to form a film.

The coagulating solution used is preferably a mixture of water, the water-soluble organic solvent used in the dope and a phase separating agent. The proportion of water is preferably selected in the range of 30–100 wt %, and more preferably in the range of 30–70 wt %. If the proportion of water is too high, the surface tends to be dense, making it difficult to obtain a non-aqueous secondary battery separator with adequate ion permeability. An excessively high water proportion also delays coagulation, not only impairing productivity but also preventing an adequate film from being obtained. In addition, from the standpoint of productivity, it is preferred for the weight ratio of the water-soluble organic solvent and phase separating agent to be combined with this weight ratio in the dope.

The support to be used for the production process is preferably a publicly known one proposed in the prior art having adequate mechanical properties and ion permeability as a non-aqueous secondary battery separator support, and it is not particularly restricted.

The thickness of the non-aqueous secondary battery separator is preferably about 10–50 μm. The thickness of the support is preferably 5–45 μm, and more preferably 5–25 μm. The non-aqueous secondary battery separator preferably has a smaller thickness from the standpoint of energy density and ion permeability. As the production process of the invention allows production of the composite porous film with high precision in terms of thickness, basis weight and morphology control as described above even with small thicknesses, it is suitable for production of non-aqueous secondary battery separators.

From the viewpoint of ion permeability, the support preferably has a MacMullin number in the range of 2–20 and especially in the range of 2–15. The MacMullin number is an index of ion permeability, and it is the value of the conductivity of the electrolyte solution alone divided by the conductivity with the electrolyte solution impregnated in the support. That is, the ion permeability is inadequate when this value is too high.

As the production process of the invention accomplishes coating of the dope on both sides of the support, it may be applied for supports such as polyolefin fine porous films, wherein it is thought virtually none of the dope is adequately impregnated into the interior, or for fiber-formed two-dimensional sheet supports such as nonwoven fabrics, wherein the dope is adequately impregnated into the interior.

Particularly in cases where the support is a nonwoven fabric, this process is effective as a production process for a non-aqueous secondary battery separator that satisfactorily exhibits the overcharge-preventing function, described in WO01/67536, discovered by the present inventors, and lithium ion secondary batteries employing separators obtained by this production process have a significant advantage in terms of safety during overcharge.

The present invention will now be explained in more detail by way of examples, which do not limit the invention.

(Measurement of MacMullin Number)

The obtained support and composite porous film were cut to 20 mmϕ and sandwiched between two SUS plates, and the MacMullin number was calculated by dividing the ion conductivity of the electrolyte solution by the conductivity as calculated from the current impedance at 10 kHz. The measuring temperature was 25° C. The electrolyte solution used for the measurement was 1 M $LiBF_4$ EC/PC (1/1 weight ratio).

(Fabrication of Composite Porous Film)

EXAMPLE 1

A PVdF copolymer with a copolymerizing composition of VdF/HFP/CTFE=92.0/4.5/3.5 (weight ratio) and Mw=410,000 was used as the organic polymer compound. The PVdF copolymer was dissolved in a mixture of DMAc (organic solvent):TPG (phase separating agent)=6:4 (weight ratio) to 12 wt % to prepare a dope. A polypropylene fine porous film (CELGARD #2400, product of Celgard Co.) having a thickness of 25.6 μm and a basis weight of 14.8 g/m² was used as the porous support. The MacMullin number of the porous support was 9.8. The coagulating solution was a mixture of water:DMAc:TPG=5:3:2.

A film was formed using the apparatus shown in FIG. 1, and Meyer bars (No. 8, 20 mm diameter, product of Yoshimitsu Precision Instruments Co.) were used as a dispensing/smoothing jig. The air gap between the two Meyer bars and the coagulating bath was 7 cm. The clearance between the two Meyer bars was 40 μm, and the polypropylene fine porous film was set roughly at the center between the two Meyer bars. The prepared dope (temperature: 30° C.) and the coagulating solution (temperature: 40° C.) were then placed in prescribed containers as preparation for film formation.

Figure 3A:
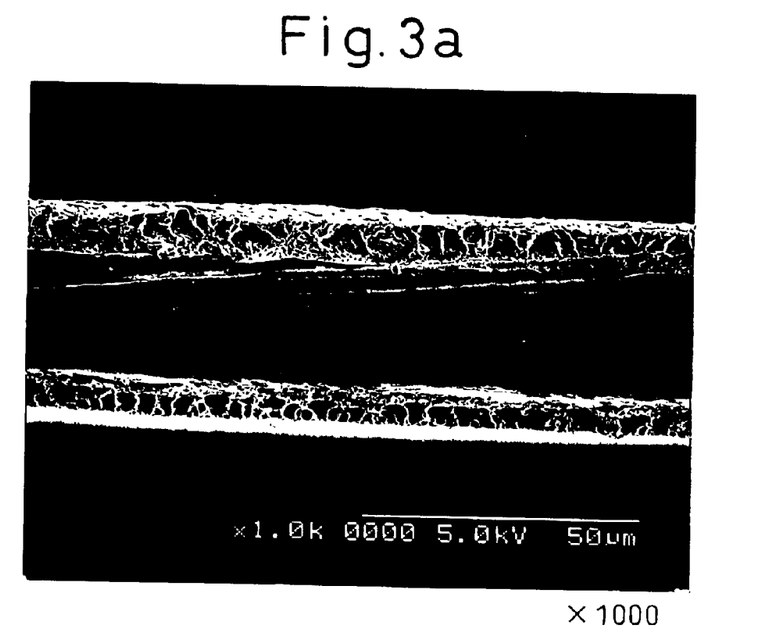
FIG. 3a shows a cross-section and FIG. 3b shows the surface.
Figure 3B:
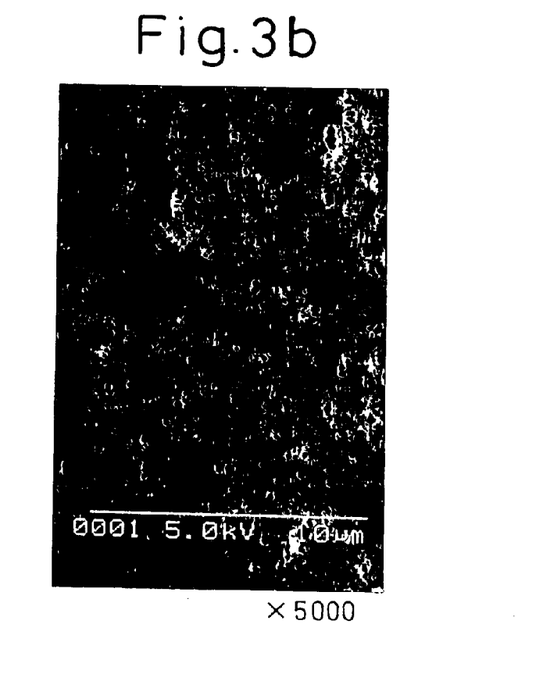

The polypropylene fine porous film was conveyed at a speed of 3 m/min, and after coating and coagulation, it was washed and dried to obtain a composite porous film. The coagulating time under these film-forming conditions was 30 seconds. The thickness of the obtained composite porous film was 39.5 μm, and the basis weight was 22.9 g/m². The handling properties of the film were satisfactory, with no peeling of the PVdF copolymer and no curling. The results of SEM observation are shown in FIGS. 3a and 3b. The cross-section (FIG. 3a) shows the state of the polypropylene fine porous film at the center, and the surface (FIG. 3b) is shown to be the same on the front and back, wherein pores with a pore diameter of 0.1–0.5 μm are interspersed.

EXAMPLE 2

Binder PET staple fibers with a fineness of 0.22 dtex (average fiber diameter of approximately 4.5 μm) were blended with crystal-oriented polyethylene terephthalate (PET) staple fibers with a fineness of 0.33 dtex (average fiber diameter of approximately 5.5 μm) at a weight ratio of 1/1, and after forming a film with a basis weight of 10 g/m² by a wet sheeting method, it was calendered at 170° C. to obtain a nonwoven fabric. The nonwoven fabric had a thickness of 15.1 μm. The MacMullin number was 4.5.

Figure 4A:
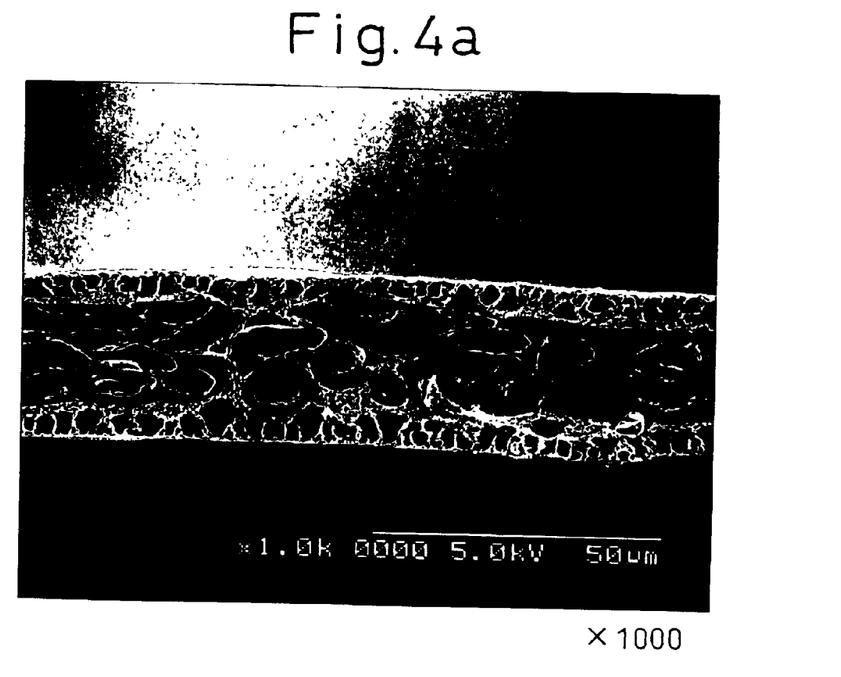
FIG. 4a shows a cross-section and FIG. 4b shows the surface.
Figure 4B:
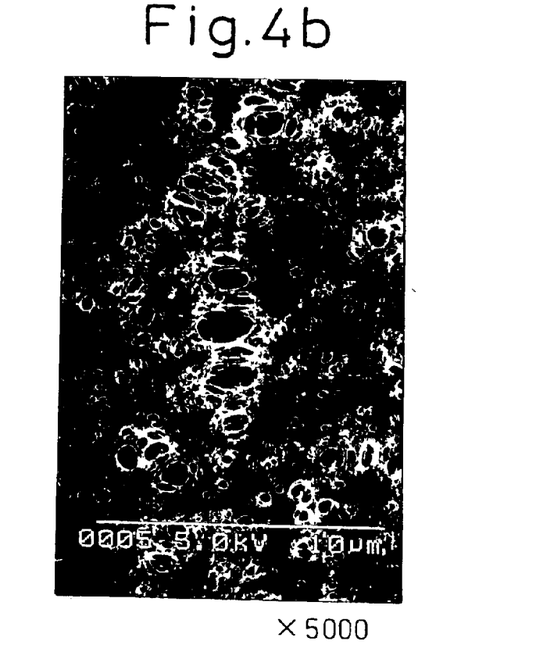

The nonwoven fabric was used as a porous support to obtain a composite porous film by the same method as in Example 1. The thickness of the obtained composite porous film was 22.8 μm, and the basis weight was 15.4 g/m². The handling properties of the film were satisfactory, with no peeling of the PVdF copolymer and no curling. The results of SEM observation are shown in FIGS. 4a and 4b. The cross-section (FIG. 4a) shows the state of the nonwoven fabric at the center, and the surface (FIG. 4b) is shown to be the same on the front and back, wherein pores with a pore diameter of 0.1–0.5 μm are interspersed.

EXAMPLE 3

A reverse roll was used as the dispensing/smoothing jig in FIG. 1. The reverse roll had a diameter of 50 mm and a stainless steel surface with a surface roughness of 1.6 S, while the clearance L between roll 1 and roll 2 was 120 μm and the rotating circumferential speed ratio of roll 1 and roll 2 with respect to the nonwoven fabric speed was 0.3. As a result of film formation under the same conditions as Example 2, a composite porous film was obtained having a film thickness of 23.0 μm and a basis weight of 15.6 g/m², as in Example 2, while according to SEM observation, the resulting composite porous film cross-section showed the nonwoven fabric at the center and identical surfaces on the front and back, with pores with a diameter of 0.1–0.5 μm interspersed.

EXAMPLE 4

A film was formed using a die such as shown in FIG. 2 as the coating apparatus instead of the dope bath and dispensing/smoothing jig. The clearance between the two die lip tips was 40 μm, and the angle between the two die lip surfaces was 10°. The die port discharge was adjusted to 0.02 CC/min•mm per die. The film-forming speed was 2 m/min, and the coagulating time was 45 seconds. The air gap between the two die lips and the coagulating bath was 7 cm. As a result of film formation under the same conditions as Example 2, a composite porous film was obtained having a film thickness of 22.5 μm and a basis weight of 15.3 g/m², as in Example 2, while according to SEM observation, the resulting composite porous film cross-section showed the nonwoven fabric at the center and the surface identical on the front and back, with pores with a diameter of 0.1–0.5 μm interspersed.

EXAMPLE 5

Crystallized m-aramid staple fibers with a fineness of 0.9 dtex (fiber diameter of approximately 10 μm) were used to form a film with a basis weight of 20 g/m² by a dry sheeting method, and then calendering at 320° C. yielded a nonwoven fabric. The nonwoven fabric had a thickness of 35.1 μm. The MacMullin number was 5.5.

As the organic polymer compound there was used a PVdF copolymer with a copolymer composition of VdF/HFP/CTFE=89.5/8.8/1.7 (weight ratio) and Mw=680,000. The PVdF copolymer was dissolved in a mixture of DMAc (organic solvent):1,3-butanediol (phase separating agent)= 7:3 (weight ratio) to 15 wt % to prepare a dope. The m-aramid nonwoven fabric prepared above was used as the porous support. The coagulating solution was a mixture of water:DMAc:1,3-butanediol=6:2.4:1.6.

A film was formed using the same apparatus as in Example 1, with a clearance between the two Meyer bars of 60 μm and a dope temperature of 60° C. The above-mentioned nonwoven fabric was used as the porous support, and the dope and coagulating solution were used for preparation for the film formation as in Example 1.

Figure 5A:
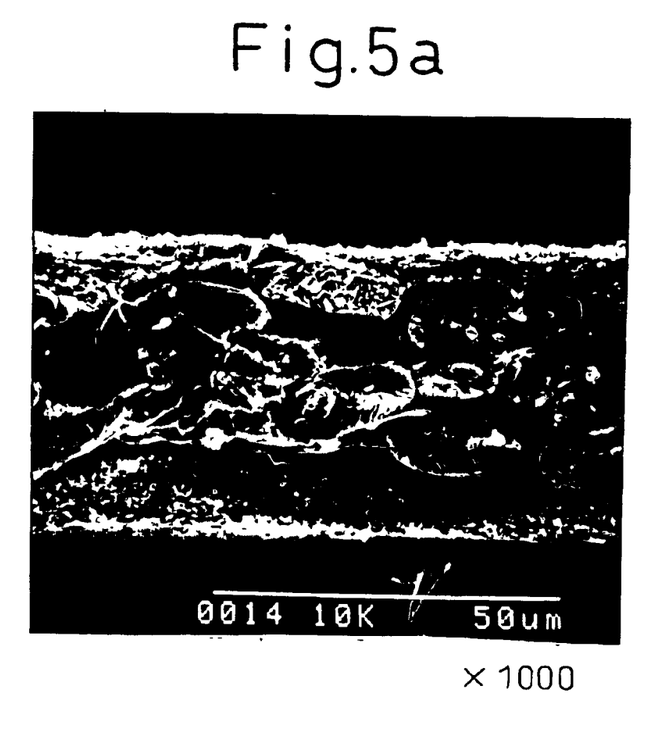
FIG. 5a shows a cross-section and FIG. 5b shows the surface.
Figure 5B:
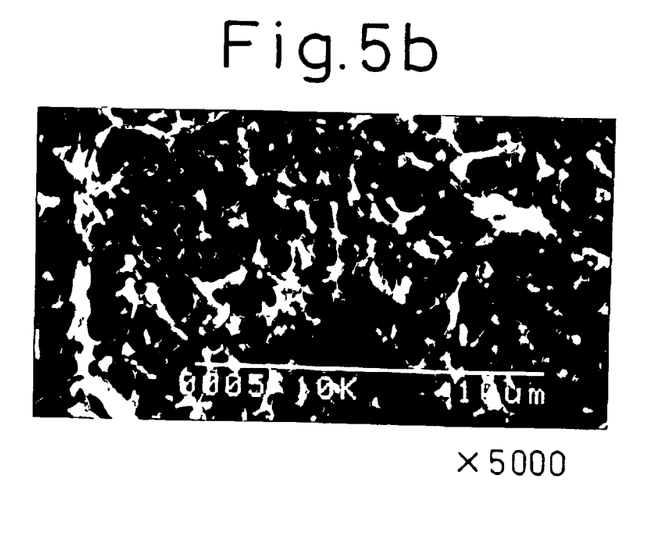

The m-aramid nonwoven fabric was conveyed at a speed of 3 m/min and, after coating and coagulation, it was washed and dried to obtain a composite porous film. The coagulation was completed between introduction into the coagulating bath and the bar, and the coagulating time under these film-forming conditions was 30 seconds. The thickness of the obtained composite porous film was 40.5 μm, and the basis weight was 32.5 g/m². The handling properties of the film were satisfactory, with no peeling of the PVdF copolymer and no curling. The results of SEM observation are shown in FIGS. 5a and 5b. The cross-section (FIG. 5a) shows the state of the m-aramid nonwoven fabric at the center, and the surface (FIG. 5b) is shown to be the same on the front and back, wherein pores with a pore diameter of 1–2 μm are interspersed and the structure is fibril-like.

EXAMPLE 6

Crystallized m-aramid staple fibers with a fineness of 0.9 dtex (fiber diameter of approximately 10 μm) were used to form a film with a basis weight of 15 g/m² by a dry sheeting method, and then calendering at 320° C. yielded a nonwoven fabric. The nonwoven fabric had a thickness of 30 μm. The MacMullin number was 5.8.

As the organic polymer compound there was used a PVdF copolymer with a copolymer composition of VdF/HFP/CTFE=88.7/4.4/6.9 (weight ratio) and Mw=530,000. The PVdF copolymer was dissolved in a mixture of DMAc (organic solvent):polypropylene glycol of average molecular weight 400 (PPG-400, phase separating agent)=6:4 (weight ratio) to 13.5 wt % to prepare a dope. The m-aramid nonwoven fabric prepared above was used as the porous support. The coagulating solution was a mixture of water:DMAc:PPG-400=6:2:2.

The above-mentioned nonwoven fabric was used as the porous support, and the dope and coagulating solution were used for preparation for the film formation as in Example 5.

Figure 6A:
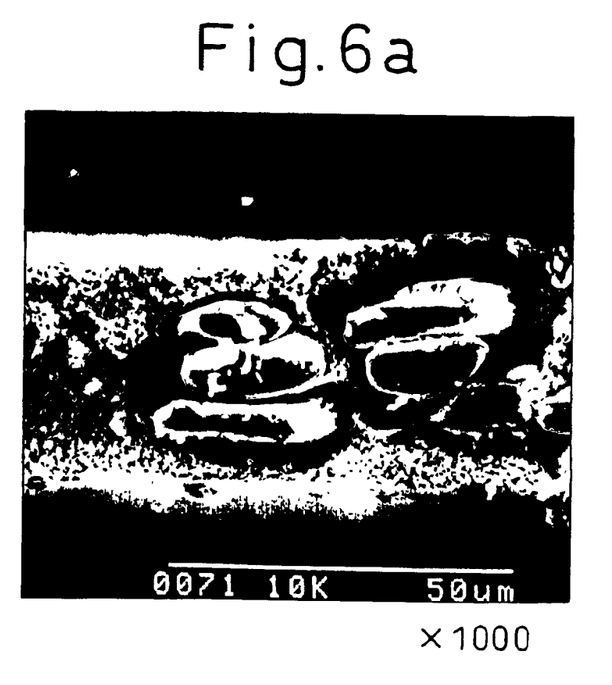
FIG. 6a shows a cross-section and FIG. 6b shows the surface.
Figure 6B:
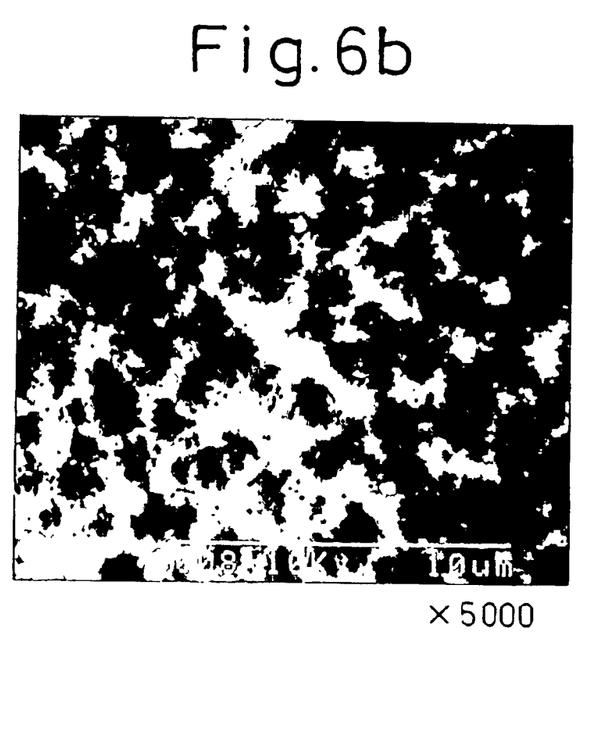

The m-aramid nonwoven fabric was conveyed at a speed of 1.5 m/min and, after coating and coagulation, it was washed and dried to obtain a composite porous film. The coagulating time under these film-forming conditions was 60 seconds. The thickness of the obtained composite porous film was 35.0 μm, and the basis weight was 22.7 g/m². The handling properties of the film were satisfactory, with no peeling of the PVdF copolymer and no curling. The results of SEM observation are shown in FIGS. 6a and 6b. The cross-section (FIG. 6a) shows the state of the m-aramid nonwoven fabric at the center, wherein the layer composed of the PVdF copolymer is completely sponge-like. The surface (FIG. 6b) is shown to be the same on the front and back, wherein pores with a pore diameter of 0.1–0.5 μm are interspersed.

EXAMPLE 7

As the organic polymer compound there was used a PVdF copolymer with a copolymer composition of VdF/perfluoromethylvinyl ether/CTFE=91.3/5.2/3.5 (weight ratio) and Mw=1,010,000. The PVdF copolymer was dissolved in a mixture of DMAc (organic solvent):PPG-400 (phase separating agent)=5:5 (weight ratio) to 15 wt % to prepare a dope. The m-aramid nonwoven fabric prepared in Example 5 was used as the porous support. The coagulating solution was a mixture of water:DMAc:PPG-400=6:2:2.

The above-mentioned nonwoven fabric was used as the porous support, and the dope and coagulating solution were used for preparation for the film formation as in Example 5.

Figure 7A:
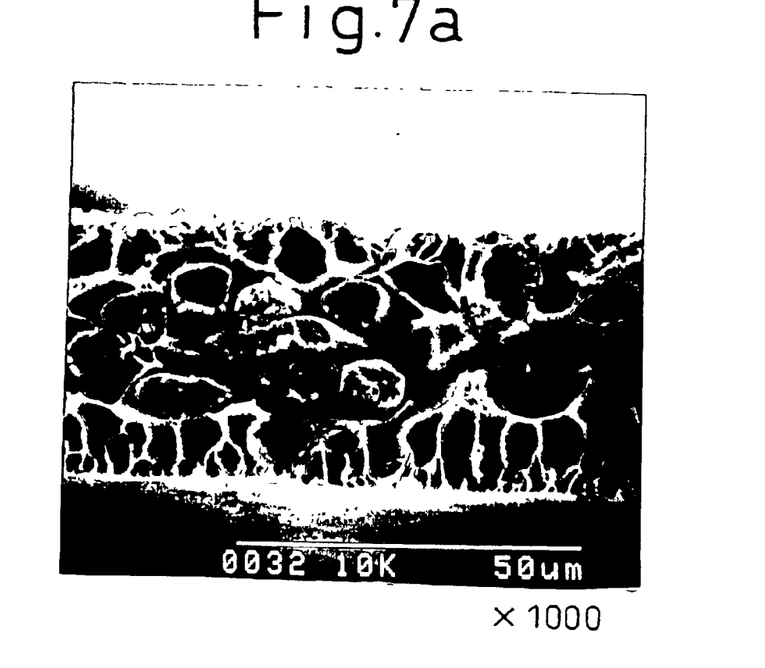
FIG. 7a shows a cross-section and FIG. 7b shows the surface.
Figure 7B:
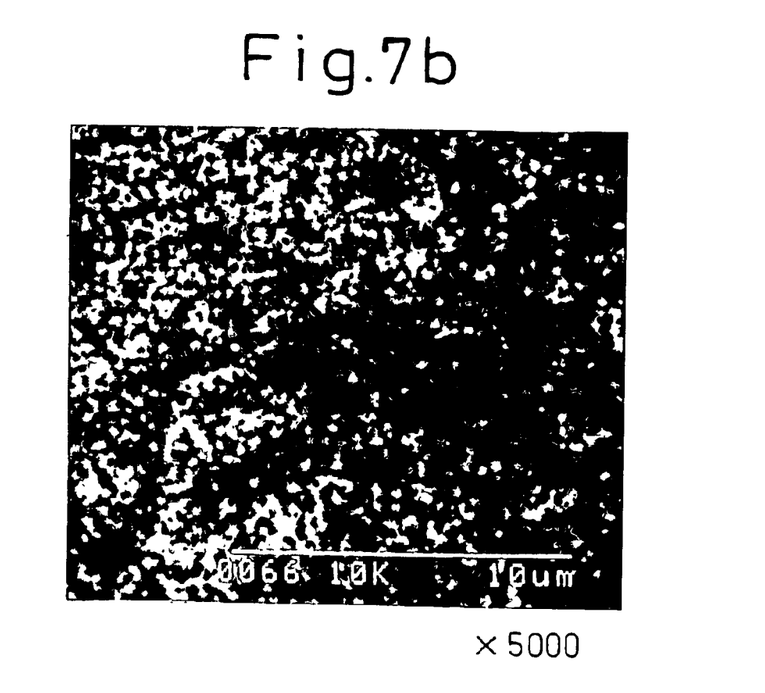

The m-aramid nonwoven fabric was conveyed at a speed of 2 m/min, and after coating and coagulation, it was washed and dried to obtain a composite porous film. The coagulating time under these film-forming conditions was 45 seconds. The thickness of the obtained composite porous film was 40.0 μm, and the basis weight was 27.4 g/m². The handling properties of the film were satisfactory, with no peeling of the PVdF copolymer and no curling. The results of SEM observation are shown in FIGS. 7a and 7b. The cross-section (FIG. 7a) shows the state of the m-aramid nonwoven fabric at the center, wherein the layer composed of the PVdF copolymer has a structure with high development of a fingerskin layer. The surface (FIG. 7b) is shown to be the same on the front and back, wherein pores with a pore diameter of 0.1–0.5 μm are interspersed.

EXAMPLE 8

Binder PET staple fibers with a fineness of 0.22 dtex (average fiber diameter of approximately 4.5 μm) were blended with crystal-oriented polyethylene terephthalate (PET) staple fibers with a fineness of 0.33 dtex (average fiber diameter of approximately 5.5 μm) at a weight ratio of 1/1, and after forming a film with a basis weight of 12 g/m² by a wet sheeting method, it was calendered at 190° C. to obtain a nonwoven fabric. The nonwoven fabric had a thickness of 18.2 μm. The MacMullin number was 6.7.

As the organic polymer compound there was used a PVdF copolymer with a copolymer composition of VdF/HFP/CTFE=88.7/4.4/6.9 (weight ratio) and Mw=530,000. The PVdF copolymer was dissolved in a mixture of DMAc (organic solvent):PPG-400 (phase separating agent)=6:4 (weight ratio) to 8 wt % to prepare a dope. The PET nonwoven fabric prepared above was used as the porous support. The coagulating solution was a mixture of water:DMAc:PPG-400=6:2:2.

The above-mentioned nonwoven fabric was used as the porous support, and the dope and coagulating solution were used for preparation for the film formation as in Example 1.

The PET nonwoven fabric was conveyed at a speed of 3 m/min and, after coating and coagulation, it was washed and dried to obtain a composite porous film. The coagulating time under these film-forming conditions was 30 seconds. The thickness of the obtained composite porous film was 23.4 μm, and the basis weight was 16.5 g/m². The handling properties of the film were satisfactory, with no peeling of the PVdF copolymer and no curling. The results of SEM observation showed a cross-section with the PET nonwoven fabric at the center, the same surface on the front and back, and pores with a pore diameter of 0.1–0.5 μm interspersed.

EXAMPLE 9

As the organic polymer compound there was used a PVdF copolymer with a copolymer composition of VdF/HFP/CTFE=92.0/4.5/3.5 (weight ratio) and Mw=410,000. The PVdF copolymer was dissolved in DMAc to 15 wt % to prepare a dope. The PET nonwoven fabric prepared in Example 2 was used as the porous support.

The above-mentioned nonwoven fabric was used as the porous support, and the dope and coagulating solution were used for preparation for the film formation as in Example 5.

The PET nonwoven fabric was conveyed at a speed of 2 m/min and, after coating and coagulation, it was washed and dried to obtain a composite porous film. The coagulating time under these film-forming conditions was 45 seconds. The thickness of the obtained composite porous film was 26.8 μm, and the basis weight was 17.9 g/m². The handling properties of the film were satisfactory, with no peeling of the PVdF copolymer and no curling. The results of SEM observation of the morphology showed absolutely no pores on either the front or back side. Observation of the cross-section showed the PET nonwoven fabric at approximately the center.

(Measurement of Porous Composite Film MacMullin Numbers)

EXAMPLE 10

The MacMullin numbers of the composite porous films fabricated in Examples 2 and 9 were measured. As a result, the MacMullin number for the film of Example 2 was 3.7, and the MacMullin number for Example 9 was 17.

These results indicate that, by addition of a phase separating agent and preparation of a mixture of the coagulating bath with a water-soluble organic solvent, a phase separating agent and water, it is possible to fabricate a composite porous film with pores opened in the surface, and that such a film exhibits adequate ion permeability rendering it suitable as a non-aqueous secondary battery separator.

(Properties of Composite Porous Film as Non-aqueous Secondary Battery Separator)

EXAMPLE 11

(Positive Electrode)

A positive electrode agent paste was prepared which contained 89.5 parts by weight of lithium cobaltate (LiCoO$_2$: product of Nippon Chemical Industry Co., Ltd.) powder, 4.5 parts by weight of acetylene black and 6 parts by dry weight of PVdF using an NMP solution containing 6 wt % PVdF. The paste was coated onto aluminum foil to a thickness of 20 μm and then dried and pressed to obtain a positive electrode with a thickness of 97 μm.

(Negative Electrode)

A negative electrode agent paste was prepared which contained, as the negative electrode active material, 87 parts by weight of mesophase carbon microbeads (MCMB: product of Osaka Gas & Chemical Co., Ltd.) powder and 3 parts by weight of acetylene black, using an NMP solution containing 6 wt % PVdF. The paste was coated onto a copper foil with a thickness of 18 μm and then dried and pressed to obtain a negative electrode with a thickness of 90 μm.

(Fabrication of Button (Coin) Batteries)

The composite porous films fabricated in Examples 1–8 were used as separators with the above-mentioned positive and negative electrodes to fabricate button batteries (CR2032) with a capacity of about 4.5 mAh. The electrolyte solution used was 1 M LiPF$_6$ EC/DEC/MEC (1/2/1 weight ratio). The fabricated button batteries were capable of charge/discharge with no problems. For each button battery, the discharge capacity ratio of 2C discharge with respect to 0.2 C discharge with 4.2 V constant current/constant voltage charging and 2.75 V constant current discharge was measured. The results are shown in Table 1.

Comparative Example 1

A button battery was fabricated in the same manner as Example 11 using a polypropylene fine porous film (product name: CELGARD #2400, product of Celgard Co.) as the separator, and the same measurement was conducted. The results are shown in Table 1.

TABLE 1

| Separator | Capacity ratio (2C/0.2C) |
|---|---|
| Example 1 | 69.5% |
| Example 2 | 94.2% |
| Example 3 | 94.0% |
| Example 4 | 94.1% |
| Example 5 | 85.0% |
| Example 6 | 88.5% |
| Example 7 | 89.2% |
| Example 8 | 96.3% |
| Polypropylene fine porous film (CELGARD #2400) | 71.0% |

The result for the button battery employing the composite porous film of Example 1 in comparison to Comparative Example 1, demonstrates that when the production process of the invention is applied, the PVdF copolymer layer exhibits almost no resistance. Also, the results for the button batteries employing the composite porous films of Examples 2–8 demonstrate that the production process of the invention can produce separators with properties exceeding those of conventional polyolefin fine porous films.

EXAMPLE 12

The electrodes fabricated in Example 11 and the composite porous films fabricated in Examples 1–8 as separators were used to fabricate film-cased batteries having an aluminum laminated film with a capacity of about 660 mAh as the casing. The batteries had a size of 62 mm×35 mm×3.6 mm. The batteries were all capable of charge/discharge. No fluid leakage occurred even with pressing. When the charged/discharged batteries were disassembled, the electrodes and their composite porous films were found to be firmly adhered together.

EXAMPLE 13

The film-cased batteries fabricated in Example 12 were subjected to an overcharging test with a charging ratio of 500% at 1C. The results are shown in Table 2.

TABLE 2

| Separator | 1C overcharge |
|---|---|
| Example 1 | x |
| Example 2 | o |
| Example 3 | o |
| Example 4 | o |
| Example 5 | o |
| Example 6 | o |
| Example 7 | o |
| Example 8 | o | o = no abnormality,
x = fire

The results for Example 13 demonstrate that the composite porous films wherein the porous supports were nonwoven fabrics exhibited the overcharge-preventing function discovered by the present inventors and described in WO01/67536, and can therefore guarantee safety during overcharge. When a nonwoven fabric is used as the porous support according to the production process of the invention, the separator exhibits a suitable overcharge-preventing function.

According to the present invention, it is possible to produce porous composite films having front/back symmetrical surface morphology, and whose surface morphology can be easily controlled. This production process is particularly suitable for production of non-aqueous secondary battery separators, and is especially suitable as a production process for non-aqueous secondary battery separators with satisfactory ion permeability, adhesion with electrodes and electrolyte solution retention. Furthermore, by using a nonwoven fabric as the porous support, it is possible to industrially produce non-aqueous secondary battery separators characterized by high safety during overcharge.

What we claim is:

1. A process for production of a composite porous film composed of an organic polymer compound surrounding a porous support, which process comprises coating both sides of a porous support with a solution (dope) of an organic polymer compound and a water-soluble organic solvent using a coating apparatus to form coated films of uniform thickness concurrently on both sides of said porous support, subsequently subjecting it to an air gap step and conveying the coated porous support into a coagulating bath containing a coagulating solution consisting of water or a mixture of water with the same solvent as said organic solvent, immersing said porous support in said coagulating bath so that the coated film on both surfaces of said coated porous support contacts directly with the coagulating bath for coagulation, and then washing and drying it.

2. A process according to claim 1, wherein the length of the air gap step is 1–100 cm.

3. A process according to claim 2, wherein said coagulating bath is situated under said coating apparatus.

4. A process according to claim 1, wherein said coating step comprises retaining said dope in said porous support and then passing the dope-retaining porous support between two opposing Meyer bars having a prescribed clearance along the conveyance path of said porous support, to form a coated film of uniform thickness on both sides of said porous support.

5. A process according to claim 4, wherein said two Meyer bars are positioned parallel, and said porous support is passed perpendicularly between the Meyer bars to retain said dope in said porous support.

6. A process according to claim 1, wherein said coating step comprises passing said porous support between two opposing dies which supply said dope at a constant quantity, along the conveyance path of said porous support, to form a coated film of uniform thickness on both sides of said porous support.

7. A process according to claim 6, wherein said dope is supplied in an equivalent amount from the two dies.

8. A process for production of a separator, for a non-aqueous secondary battery capable of producing electromotive force by lithium doping/dedoping, which process comprises coating both sides of a porous support for a non-aqueous secondary battery separator with a solution (dope) comprising an organic polymer compound and a water-soluble organic solvent using a coating apparatus to form coated films of uniform thickness concurrently on both sides of said porous support, subsequently subjecting it to an air gap step and conveying the coated porous support into a coagulating bath containing a coagulating solution consisting of water or a mixture of water with the same solvent as said organic solvent, immersing said porous support in said coagulating bath so that the coated film on both surfaces of said coated porous support contacts directly with the coagulating bath for coagulation, and then washing and drying it.

9. A process according to claim 8, wherein the length of the air gap step is 1–100 cm.

10. A process according to claim 9, wherein said coagulating bath is situated under said coating apparatus.

11. A process according to claim 8, wherein said organic polymer compound is polyvinylidene fluoride (PVdF), a PVdF copolymer or an organic polymer compound composed mainly of PVdF.

12. A process according to claim 8, wherein said porous support has a thickness of 5–45 $\mu$m and a MacMullin number of 2–20.

13. A process according to claim 12, wherein said porous support is a nonwoven fabric.

14. A process according to claim 8, wherein said coating step comprises retaining said dope in said porous support and then passing the dope-retaining porous support between two opposing Meyer bars having a prescribed clearance, along the conveyance path of said porous support, to form a coated film of uniform thickness on both sides of said porous support.

15. A process according to claim 14, wherein said Meyer bars are positioned parallel, and said porous support is passed perpendicularly between the Meyer bars to retain said dope in said porous support.

16. A process according to claim 8, wherein said coating step comprises passing said porous support between two opposing dies which supply said dope at a constant quantity, along the conveyance path of said porous support, to form a coated film of uniform thickness on both sides of said porous support.

17. A process according to claim 16, wherein said dope is supplied in an equivalent amount from the two dies.

18. A process according to claim 8, wherein said dope contains a phase-separating agent at a concentration of 5–50 wt %, or the proportion of water in said coagulating bath-is 30–70 wt %.

\* \* \* \* \*